United States Patent [19]
Uehara et al.

[11] Patent Number: 5,754,022
[45] Date of Patent: May 19, 1998

[54] OPTICAL PICKUP MOVING MECHANISM

[75] Inventors: Kenji Uehara, Fukushima-ken; Mitsunori Sakashita, Miyagi-ken, both of Japan

[73] Assignee: Alps Electric Co., Ltd., Tokyo, Japan

[21] Appl. No.: 796,172

[22] Filed: Feb. 6, 1997

[30] Foreign Application Priority Data

Feb. 8, 1996 [JP] Japan ................ 8-022697

[51] Int. Cl.$^6$ ................ G11B 21/02
[52] U.S. Cl. ................ 318/474; 318/626; 318/466; 369/33; 369/52
[58] Field of Search ................ 318/434, 466, 318/474, 626, 685, 696; 369/33, 34, 44.11, 52

[56] References Cited

U.S. PATENT DOCUMENTS

| | | | |
|---|---|---|---|
| 5,012,168 | 4/1991 | Dara et al. | 318/434 |
| 5,040,159 | 8/1991 | Oliver et al. | 369/34 |
| 5,134,600 | 7/1992 | Oliver et al. | 369/34 |

*Primary Examiner*—Bentsu Ro
*Attorney, Agent, or Firm*—Guy W. Shoup

[57] ABSTRACT

An optical pickup is provided with a limiting wall spaced a predetermined distance apart from a screw shaft to limit the separation of an interlocking projection away from the screw shaft, so that the interlocking projection cannot be disengaged from the helical groove of the screw shaft and, consequently, the screw shaft becomes unable to rotate. This state in which the screw shaft is unable to be rotated, i.e., a state where the optical pickup has bee moved to its inner limit position, can be detected through the detection of a change in the coil current of a stepping motor by a coil current measuring means or through the detection of the increase of voltage induced by the rotation of the magnet of the stepping motor to a predetermined level on the basis of the measured coil current measured by the current measuring means.

3 Claims, 6 Drawing Sheets

OPTICAL PICKUP MOVING MECHANISM

BACKGROUND OF THE INVENTION

The present invention relate to an optical pickup moving mechanism suitable for use in a CD ROM drive.

A head moving mechanism which reciprocates a head along a straight path by rotatively driving a screw shaft by a stepping motor has widely been used in magnetic disk drives and the like and has become used in optical disk drives, such as CD ROM drives, in recent years.

In an optical disk drive employing such a head moving mechanism, an interlocking projection formed in an optical pickup, which writes information to and read information from an optical disk, is slidably fitted in the helical groove of a screw shaft to reciprocate the optical pickup along a straight path relative to the optical disk. The screw shaft is rotated in the normal direction or the reverse direction by a stepping motor to move the optical pickup through the interlocking projection along the axis of the screw shaft in a forward or a backward direction.

When the optical disk is loaded into the optical disk drive, first, the optical pickup is moved to an inner limit position (initial position) corresponding to the innermost track on the optical disk, and then the optical pickup is moved radially outward of the optical disk. Therefore, the arrival of the optical pickup at the inner limit position must be detected by some means. The conventional optical pickup moving mechanism employed in the optical disk drive is provided with a detection switch (inner limit switch) disposed at a position near the inner limit position in an optical pickup moving range. The actuator of the detection switch is operated by a driving force transmitted to the moving optical pickup upon the arrival of the optical pickup at the inner limit position.

This conventional optical pickup moving mechanism needs the detection switch (inner limit switch) disposed at the position near the inner limit position in the optical pickup moving range. However, in recent miniaturized optical disk drives or optical drives of a small thickness, only a small space near the bearing supporting the screw shaft and a spindle motor is available for placing the detection switch, which makes assembling work including wiring difficult, and the necessity of securing a space for installing the detection switch in the optical disk drive has been a main impediment to the reduction of the thickness of the optical disk drive and the miniaturization of the same. Moreover, since timing of closing a push switch, which is employed generally as the detection switch, is liable to be advanced or delayed, it is difficult to detect the arrival of the optical pickup at the initial position in a desired high accuracy.

SUMMARY OF THE INVENTION

Accordingly, it is an object of the present invention to provide an optical pickup moving mechanism, which moves an optical pickup by a screw shaft driven by a stepping motor, capable of accurately detecting the arrival of the optical pickup at an initial position without using any detection switch.

When the stepping motor attempts to drive the screw shaft for further rotation after the optical pickup has arrived at the initial position and an interlocking projection of the optical pickup in engagement with the helical groove of the screw shaft is about to disengage from the spiral groove, the optical pickup is restrained from further movement to lock the screw shaft, and the arrival of the optical pickup at the initial position is detected from a change in the current flowing through the coil of the stepping motor.

According to one aspect of the present invention, an optical pickup moving mechanism comprises a guide shaft in sliding engagement with one end portion of an optical pickup for writing information to and reading information from an optical disk, an interlocking projection formed at the other end portion of the optical pickup, a screw shaft having a spiral groove slidably receiving the interlocking projection of the optical pickup, and a stepping motor for driving the screw shaft for rotation to move the optical pickup in opposite directions along a straight path in a predetermined moving range.

An optical pickup stopping member prevents the interlocking projection of the optical pickup from being disengaged from the helical groove of the screw shaft to restrain the optical pickup from further movement beyond the initial position corresponding to the inner limit position of the moving range. A current measuring means measures a coil current flowing through the coil of the stepping motor a predetermined time after time when a voltage is applied to the coil of the stepping motor. A voltage detecting means determines whether or not a voltage induced by the rotation of the magnet of the stepping motor has increased to a predetermined level on the basis of the measured coil current measured by the current measuring means.

Although the stepping motor attempts to drive the screw shaft for further rotation after the optical pickup has arrived at its initial position corresponding to the inner limit position of the moving range and the interlocking projection of the optical pickup is forced to be disengaged from the helical groove of the screw shaft, the optical pickup is restrained from further movement beyond the initial position corresponding to the inner limit position of the moving range by the optical pickup stopping member. Consequently, the stepping motor is unable to rotate the screw shaft, the magnet of the stepping motor is unable to generate any induced voltage, the coil current of the stepping motor approaches a coil time constant characteristic accordingly, and the coil current reaches a fixed level in a predetermined time. Therefore, a state in which the optical pickup has arrived at the initial position and the screw shaft is unable to be rotated can be detected by measuring the coil current at the time a predetermined time has elapsed after a voltage is applied to the coil of the stepping motor, and hence any detection switch (limit switch) for detecting the arrival of the optical pickup at the initial position is unnecessary.

The optical pickup stopping member may be formed integrally with the optical pickup or may be a separate member disposed so as to engage with the interlocking projection of the optical pickup upon the arrival of the optical pickup at the inner limit position of the moving range.

BRIEF DESCRIPTION OF THE DRAWINGS

The above and other objects, features and advantages of the present invention will become more apparent from the following description taken in connection with the accompanying drawings, in which.

DETAILED DESCRIPTION OF THE PREFERRED EMBODIMENTS

Figure 1:
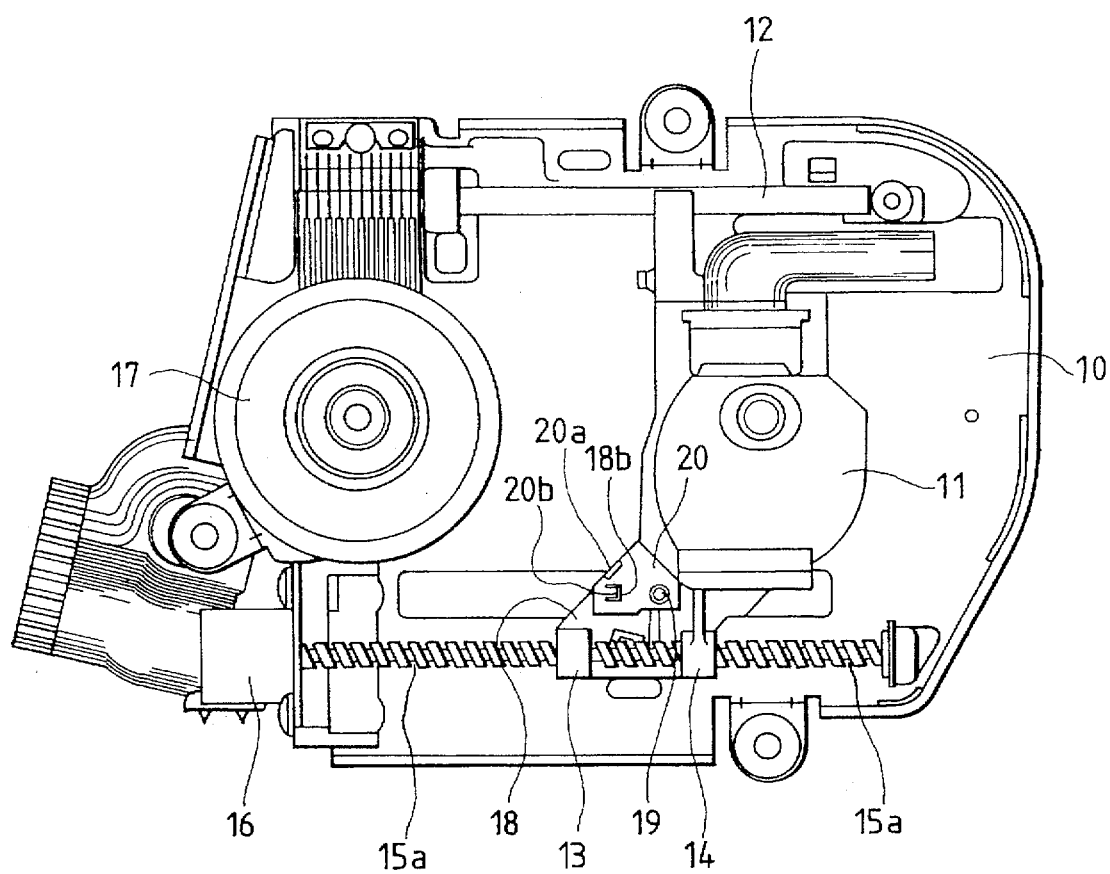
FIG. 1 is a plan view of an optical disk drive employing an optical pickup moving mechanism in a first embodiment according to the present invention.
Figure 4:
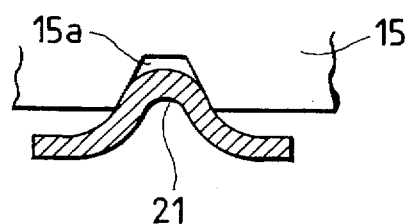
FIG. 4 is a sectional view of an essential portion of the elastic member of assistance in explaining the engagement of the interlocking projection and a screw shaft.

Referring to FIG. 1 showing an optical disk drive provided with an optical pickup moving mechanism, arranged on a chassis 10 are an optical pickup 11 provided with an optical head for writing information to and reading information from an optical disk, a guide shaft 12 slidably supporting the optical pickup 11 at one end the same, a pair of sleeves 13 and 14 formed by molding and projecting from the other end of the optical pickup 11, a screw shaft 15 slidably mounted with the sleeves 13 and 14, a support plate 18 formed integrally with the sleeves 13 and 14 and extending in a space between the chassis 10 and the screw shaft 15, a stepping motor 16 for intermittently driving the screw shaft 15 for rotation, and a spindle motor 17 for driving an optical disk loaded into the optical disk drive for rotation. The support plate 18 is attached to the optical pickup 11, and an elastic member 20 formed by processing a plate spring is fastened to the support plate 18 with a screw 19. An interlocking projection 21 is formed in the elastic member 20 at a position between the pair of sleeves 13 and 14 so as to be pressed in the helical groove 15a of the screw shaft 15 as shown in FIG. 4. The interlocking projection 21 is in line contact with the side surfaces of the helical groove 15a and is able to slide relative to the side surfaces of the helical groove 15a. When the screw shaft 15 is driven for rotation by the stepping motor 16, the optical pickup 11 moves along the axes of the guide shaft 12 and the screw shaft 15 as the interlocking projection 21 is moved by the screw shaft 15.

Figure 2:
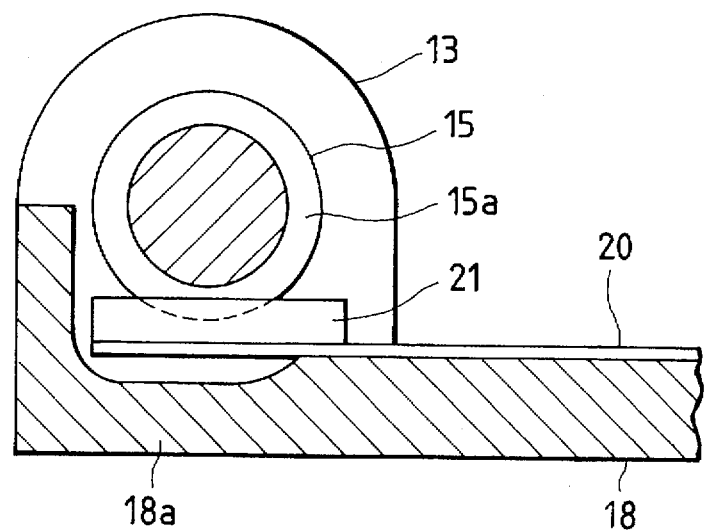
FIG. 2 is a sectional view of an essential portion of the optical pickup moving mechanism shown in FIG. 1.
Figure 3:
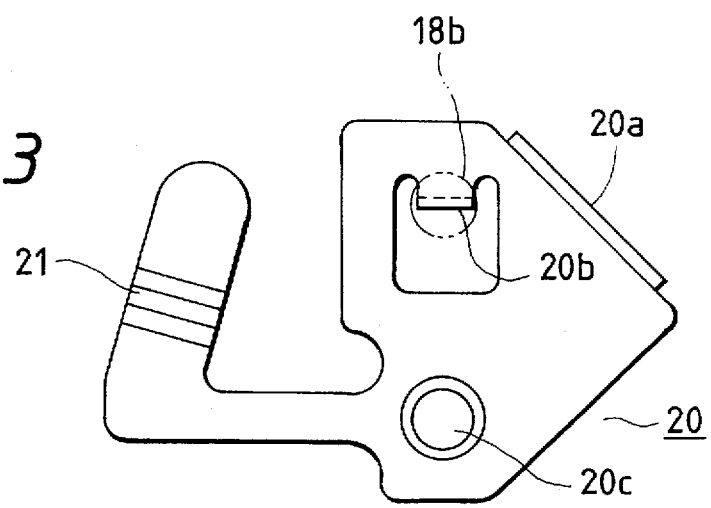
FIG. 3 is a plan view of an elastic member with an interlocking projection made from a plate spring, shown in FIGS. 1 and 2.

As shown in FIG. 3, the elastic member 20 has a lug 20a formed by raising a base portion thereof to facilitate handling the elastic member 20 when attaching the same to the support plate 18, a stopping projection 20b to be fitted in a recess 18b formed in the support plate 18 to restrain the elastic member 20 from turning relative to the support plate 18, and a threaded hole 20c into which the screw 19 is screwed. A portion of the support plate 18 lying in a space between the chassis 10 and the screw shaft 15 serves as a limiting wall 18a provided in its upper surface with a clearance groove and extending close to the back surface of the interlocking projection 21 as shown in FIG. 2.

Figure 6:
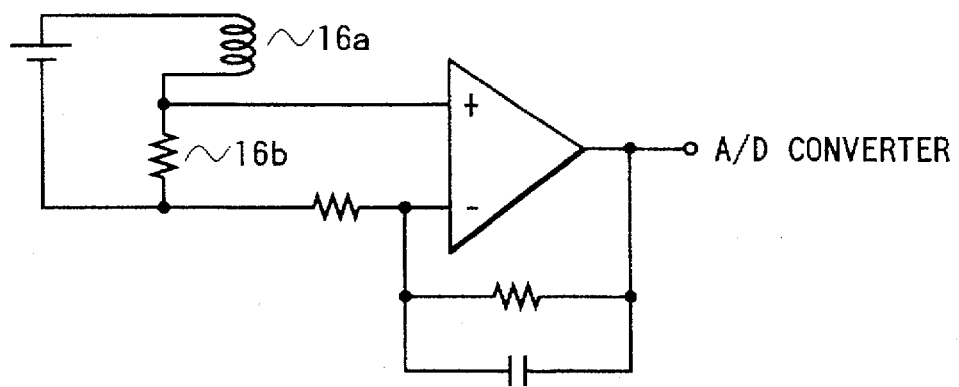
FIG. 6 is a circuit diagram of a coil current measuring circuit for measuring the coil current of the stepping motor included in the optical disk drive shown in FIG. 1.

The optical pickup moving mechanism is provided with a coil current measuring means for measuring the current flowing through the coil 16a of the stepping motor 16 (FIG. 6) at the time a predetermined time has elapsed after a voltage is applied to the coil 16a, and an induced voltage examining means which measures an induced voltage induced by the rotating magnet, not shown, of the stepping motor 16 and decides on the basis of a measured current measured by the current measuring means whether or not the induced voltage has reached a predetermined level.

Figure 5:
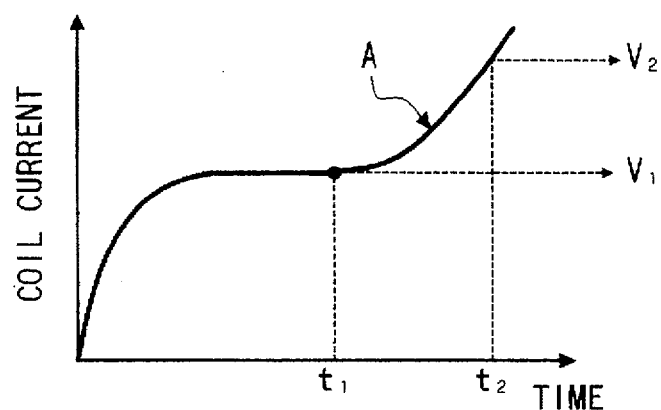
FIG. 5 is a graph showing a characteristic variation of coil current with time after time when a voltage is applied to a stepping motor included in the optical disk drive shown in FIG. 1.
Figure 7:
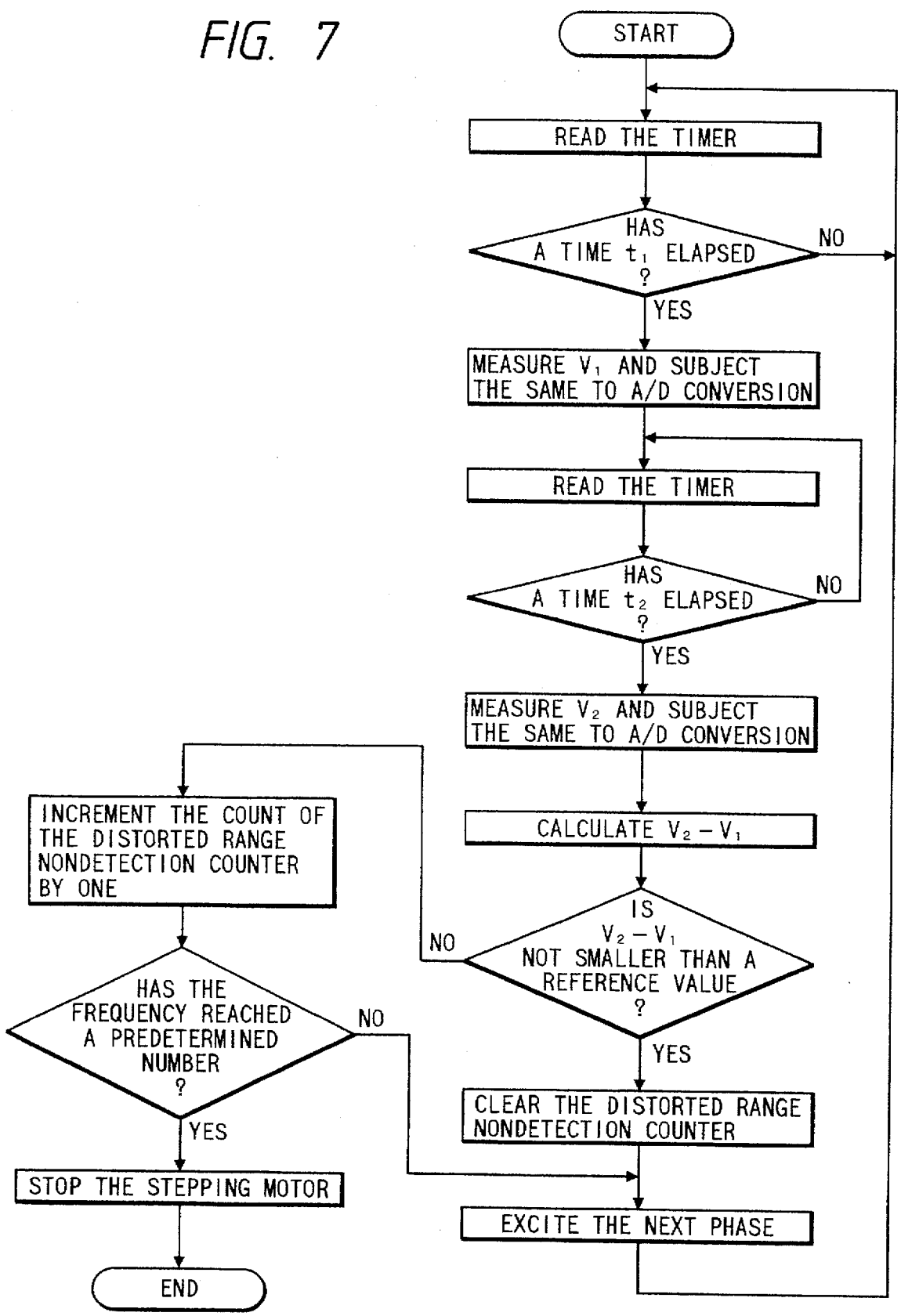
FIG. 7 is a flow chart of a procedure for determining whether or not the screw shaft shown in FIGS. 1 and 2 is locked.

The coil current flowing through the coil 16a while the screw shaft 15 is rotating in synchronism with the rotation of the stepping motor 16 is affected by an induced voltage induced by the rotating magnet of the stepping motor 16 and varies in a curve as shown in FIG. 5. The coil current increases sharply in a distorted range A between time points respectively at predetermined times at and $t_2$ from a time point when a voltage is applied to the coil 16a. As is obvious from a flow chart shown in FIG. 7, a voltage VI corresponding to the coil current after the time $t_1$, has elapsed from time when the voltage is applied to the coil 16a and a voltage $V_2$ corresponding to the coil current after the time $t_2$ has elapsed from time when the voltage is applied to the coil 16a are measured, the voltage difference $(V_2-V_1)$ is calculated, and it is determined that the screw shaft 15 is rotating and the distorted range A has appeared if the voltage difference $(V_2-V_1)$ is not less than a reference value. If the distorted range A does not appear, the voltage difference $(V_2-V_1)$ is less than the reference value. If voltage differences $(V_2-V_1)$ not less than the reference value are not detected a predetermined number of times successively, it is determined that the rotation of the screw shaft 15 is obstructed, and then the stepping motor 16 is stopped.

The measured coil current flowing through the coil 16a of the stepping motor 16 is converted into a corresponding voltage by a sensing resistor 16b, and the voltage is subjected to A/D conversion.

In this optical pickup moving mechanism, if the screw shaft 15 is driven for rotation after the optical pickup 11 has arrived at the inner limit position corresponding to the innermost track of the optical disk, i.e., an initial position on the optical disk, and the optical pickup 11 is restrained from further movement beyond the inner limit position, the interlocking projection 21 is forced to be disengaged from the helical groove 15a. Then, the limiting wall 18a spaced a distance determined by the sleeves 13 and 14 apart from the screw shaft 15 limits the separation of the interlocking projection 21 away from the screw shaft 21 from behind the interlocking projection 21, so that the interlocking projection 21 cannot be disengaged from the helical groove 15a and, consequently, the screw shaft 15 becomes unable to rotate. This state in which the screw shaft 15 is unable to be rotated can be detected through the detection of a change in the coil current of the stepping motor 16 by the coil current measuring means or the induced voltage examining means. Thus, the arrival of the optical pickup 11 at the inner limit position can surely be detected without using any detection switch (inner limit switch) which is employed in the conventional optical pickup moving mechanism.

If the detection switch, which is subject to severe restrictions on space available and affects adversely to work for assembling the optical disk drive and wiring, is omitted, the work for assembling the optical disk drive is facilitated, and the optical disk drive can be miniaturized and formed in a thin construction. Timing of closing a push switch, which is employed generally as the detection switch, is liable to be advanced or delayed. Therefore, the omission of the detection switch and the use of the foregoing method of detecting the arrival of the optical pickup 11 at the inner limit position on the basis of the measured coil current improves the accuracy of detection, and enables the accurate detection of the arrival of the optical pickup 11 at the inner limit position, i.e., the initial position. The omission of the detection switch, i.e., a mechanical part, reduces the probability of failure and extends the service life of the optical pickup moving mechanism.

An optical pickup moving mechanism in a second embodiment according to the present invention will be described with reference to FIGS. 8 and 9, in which parts like or corresponding to those shown in FIGS. 1 and 2 are designated by the same reference characters.

Figure 8:
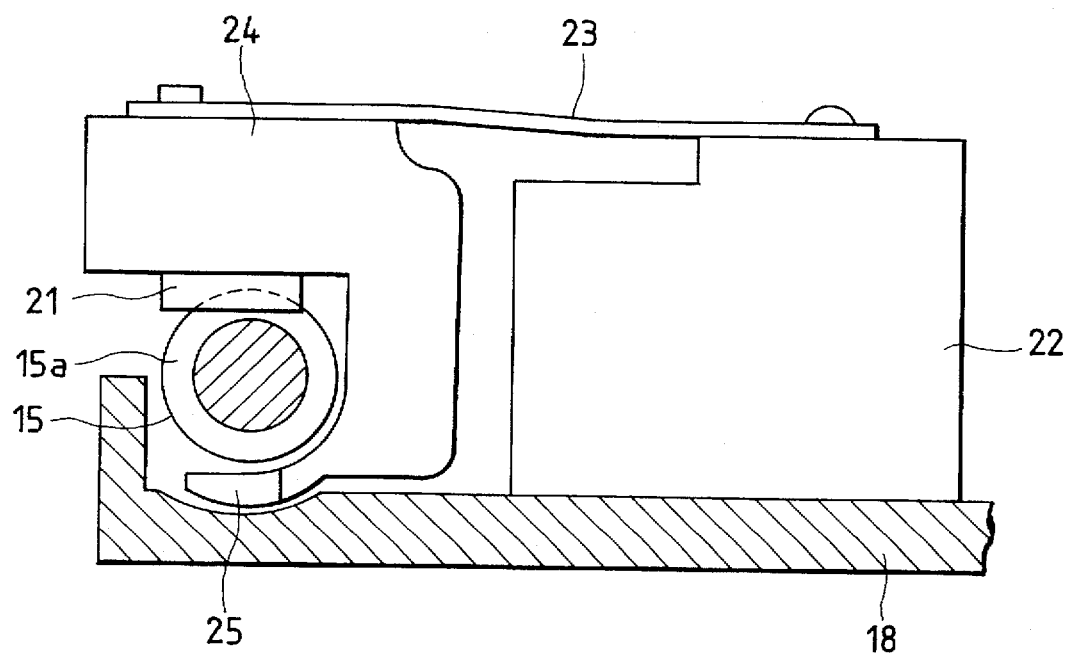
FIG. 8 is a sectional view of an essential portion of an optical pickup moving mechanism in a second embodiment according to the present invention.
Figure 9:
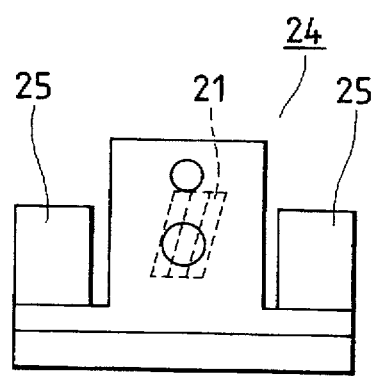
FIG. 9 is a plan view of a sliding member with a projection, shown in FIG. 8.

Referring to FIGS. 8 and 9, the optical pickup moving mechanism has a support plate 18 supporting an optical pickup, not shown, a spacer 22 mounted on the support plate 18, a place spring 23 attached to the spacer 22, and an interlocking member 24 formed by molding, attached to the plate spring 23, and provided with an interlocking projection 21 projecting downward from an upper portion thereof so as to be pressed in the helical groove 15a of a screw shaft 15, and a pair of limiting projections 25 laterally projecting from the lower portion thereof opposite to the interlocking projection 21 with respect to the screw shaft 15. When a driving force for rotating the screw shaft 15 is exerted on the screw shaft 15 after the optical pickup has arrived at its inner limit position, the interlocking projection 21 is urged to be separated from the helical groove 15a of the screw shaft 15 and whereby the interlocking member 24 is moved so that the limiting portions 25 come into contact with the screw shaft 15 to restrain the screw shaft 15 from rotation. Then, the state in which the screw shaft 15 is unable to be rotated can be detected through the detection of a change in the coil current of a stepping motor by a coil current measuring means. Thus, the arrival of the optical pickup 11 at the inner limit position can surely be detected without using any detection switch (inner limit switch).

Figure 10:
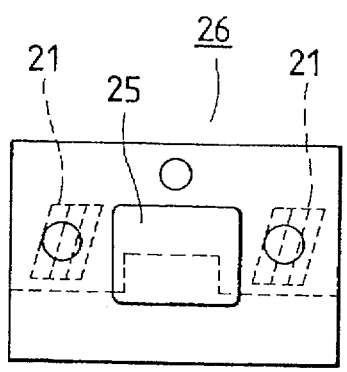
FIG. 10 is a modification of the sliding member shown in FIG. 9.

Although interlocking member 24 of the optical pickup moving mechanism in the second embodiment is provided with the interlocking projection 21 and the pair of limiting projections 25, the interlocking member may be provided with two interlocking projections 21 and one limiting projection 25 as shown in FIG. 10.

An optical pickup moving mechanism in a third embodiment according to the present invention will be described with reference to FIG. 11, in which parts like or corresponding to those shown in FIGS. 1 and 2 are designated by the same reference characters.

Figure 11:
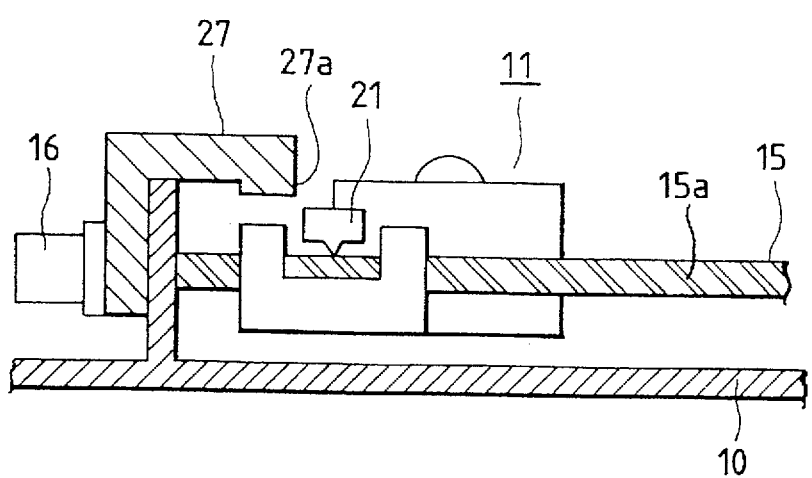
FIG. 11 is a side view of an essential portion of an optical pickup moving mechanism in a third embodiment according to the present invention.

Referring to FIG. 11, in the optical pickup moving mechanism, a screw shaft 15 is supported at its one end in a bearing held on an inner support member 27 provided with a stopping arm 27a. When the screw shaft 15 is driven further for rotation after the arrival of an optical pickup 11 at its inner limit position and an interlocking projection 21 in engagement with the helical groove 15a of the screw shaft 15 is forced to be pushed slightly radially outward of the helical groove 15a and come into contact with the stopping arm 27a, so that the further radial outward movement of the interlocking projection 21 is stopped. Consequently, the screw shaft 15 is restrained from rotation upon the arrival of the optical pickup 11 at the inner limit position. This state in which the screw shaft 15 is unable to be rotated can be detected through the detection of a change in the coil current of a stepping motor by a coil current measuring means. Thus, the arrival of the optical pickup 11 at the inner limit position can surely be detected without using any detection switch (inner limit switch).

Although the invention has been described in its preferred form with a certain degree of particularity, obviously many changes and variations are possible therein. It is therefore to be understood that the present invention may be practiced otherwise as specifically described herein without departing from the scope and spirit thereof.

What is claimed is:

1. An optical pickup moving mechanism comprising:
    a guide shaft in sliding engagement with one end portion of an optical pickup for writing information to and reading information from an optical disk;
    an interlocking projection formed on the other end portion of the optical pickup;
    a screw shaft having a spiral groove slidably receiving the interlocking projection of the optical pickup; and
    a stepping motor for driving the screw shaft for rotation to move the optical pickup in opposite directions along a straight path in a predetermined moving range;
    the improvement comprising:
    an optical pickup stopping member for preventing the interlocking projection of the optical pickup from being disengaged from the spiral groove of the screw shaft to restrain the optical pickup from further movement beyond an inner limit position of an optical pickup moving range corresponding to an initial position on an optical disk;
    a current measuring means for measuring a coil current flowing through the coil of the stepping motor a predetermined time after time when a voltage is applied to the coil of the stepping motor; and
    a voltage detecting means for determining whether or not a voltage induced by the rotation of the magnet of the stepping motor has increased to a predetermined level on the basis of the measured coil current measured by the current measuring means.

2. An optical pickup moving mechanism according to claim 1, wherein the optical pickup stopping member is formed integrally with the optical pickup.

3. An optical pickup moving mechanism according to claim 1, wherein the optical pickup stopping member and the optical pickup are formed separately, and the optical pickup stopping member is disposed so as to be close to the interlocking projection when the optical pickup moved to the inner limit position of the optical pickup moving range.

* * * * *